Patented Jan. 28, 1941

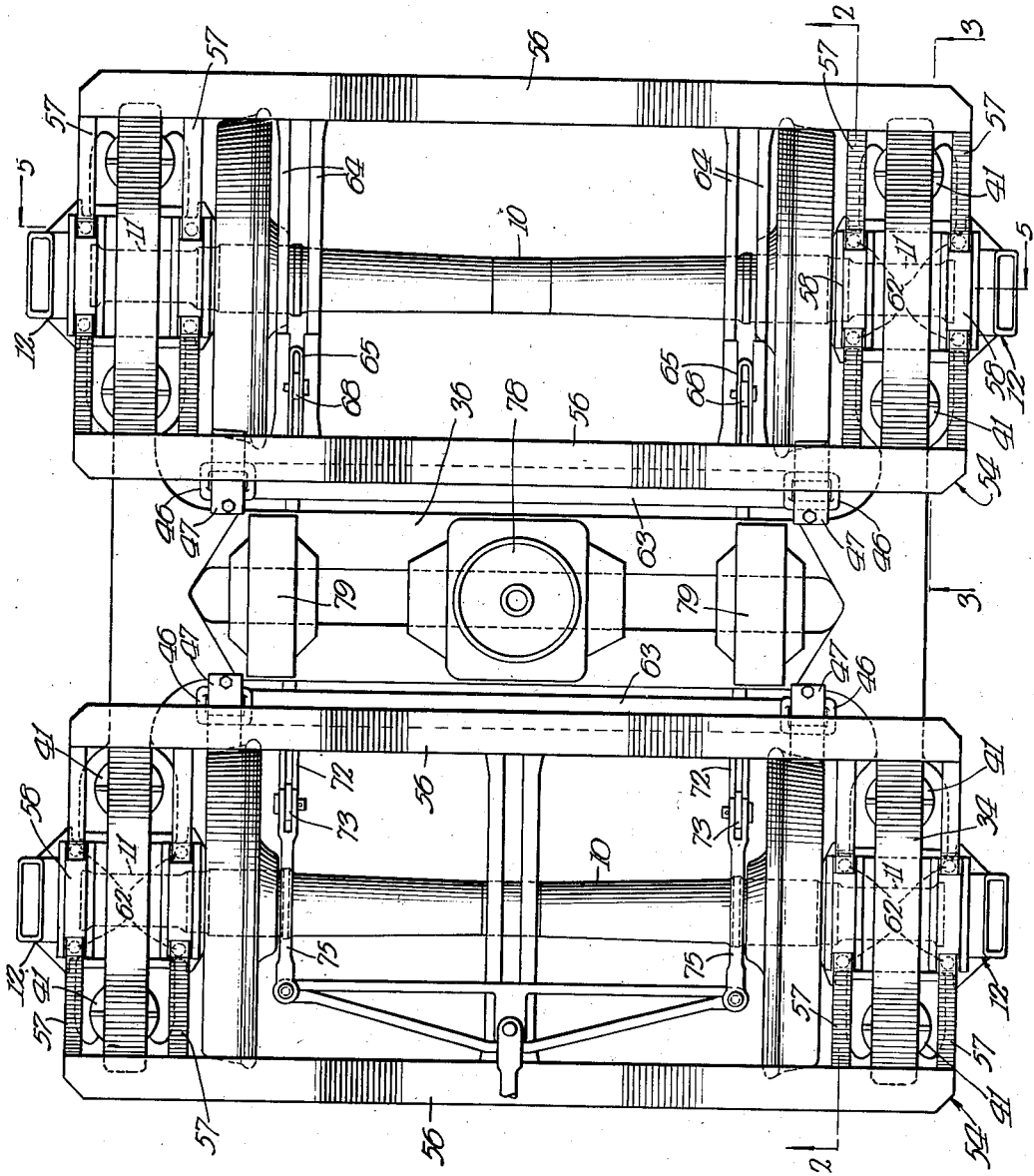

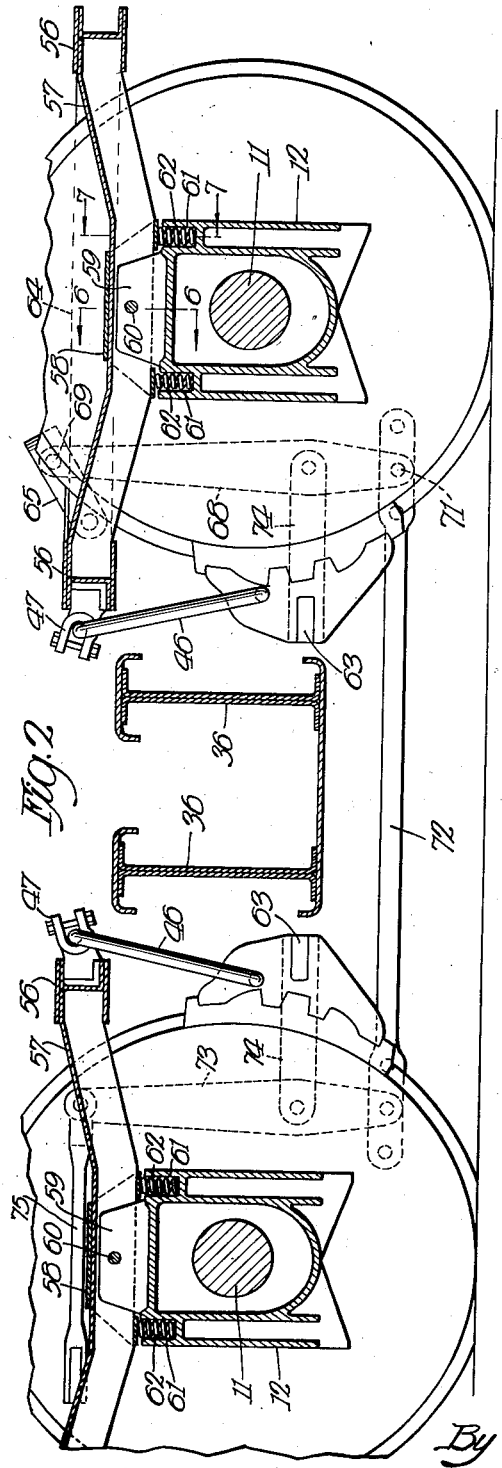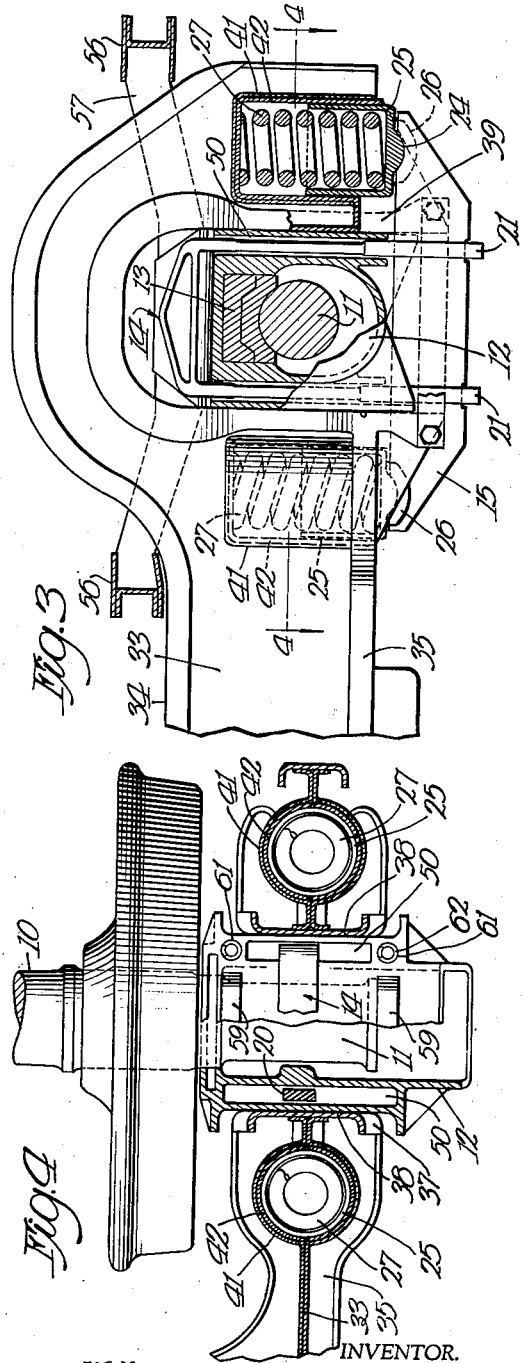

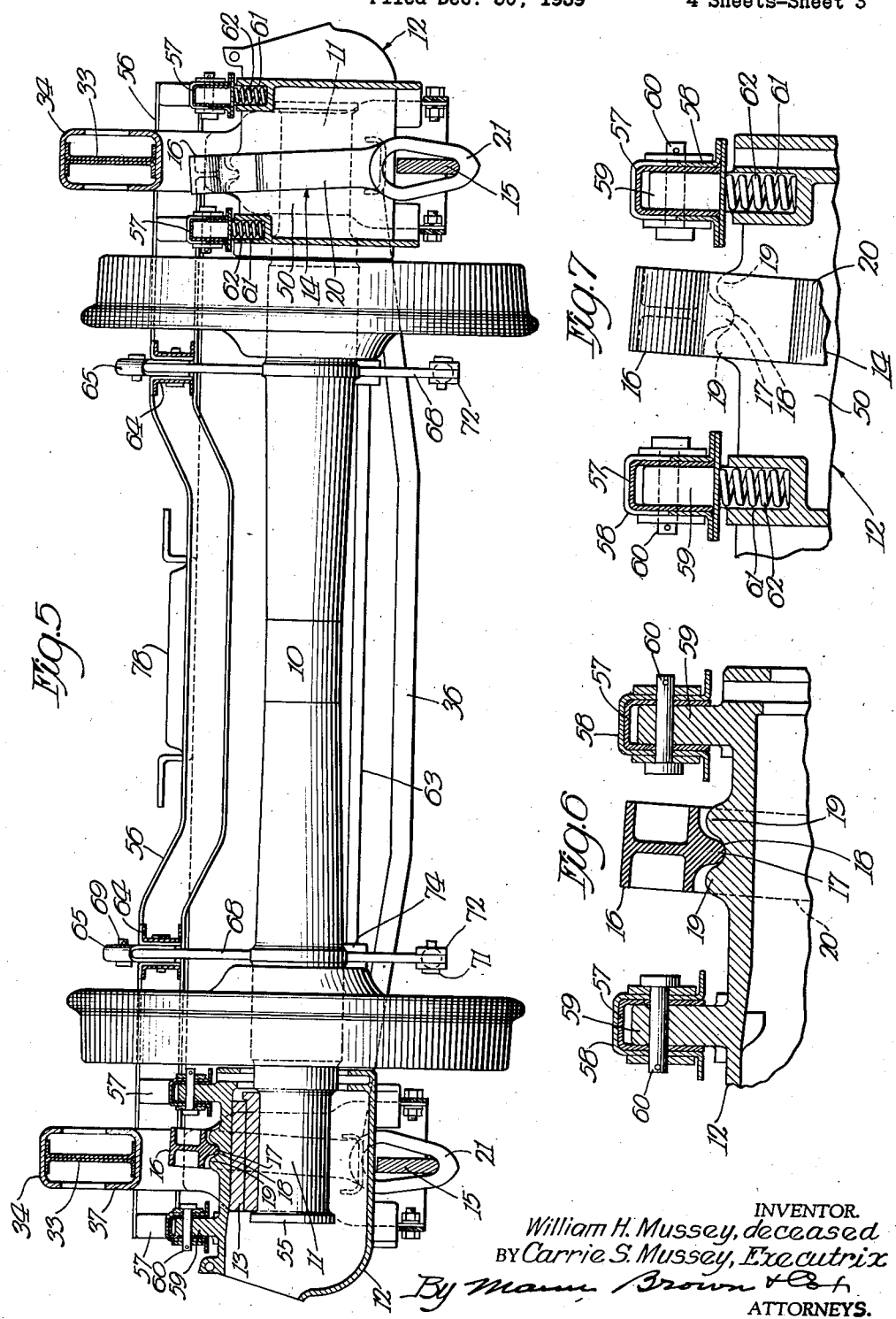

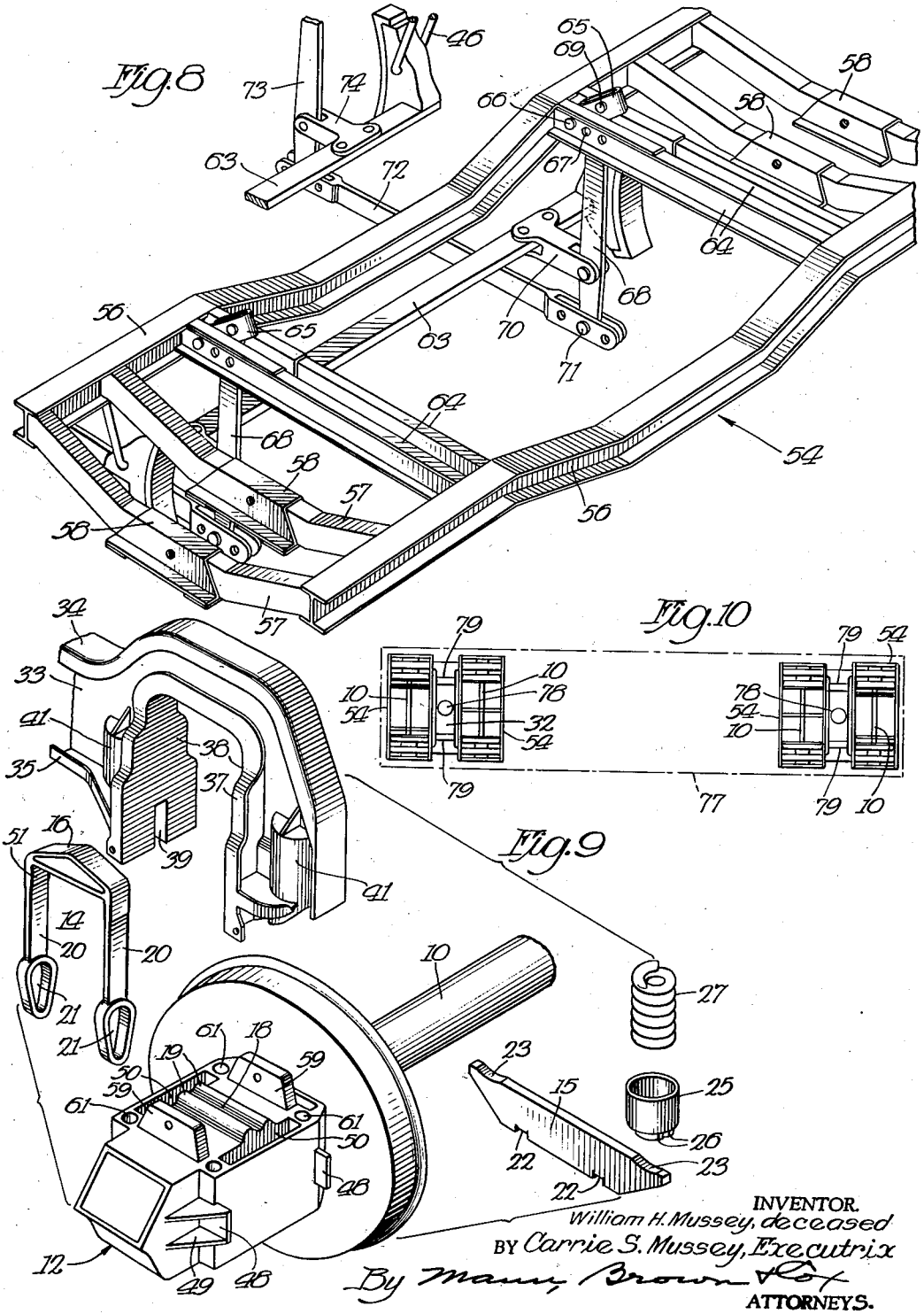

2,230,215

UNITED STATES PATENT OFFICE 2,230,215

CAR TRUCK

William H. Mussey, deceased, late of Chicago, Ill., by Carrie S. Mussey, executrix, Chicago, Ill., assignor to Pullman-Standard Car Manufacturing Company, Chicago, Ill., a corporation of Delaware Application December 30, 1939, Serial No. 311,867

13 Claims. (Cl. 105—222)

The principal object of this invention is to provide a car in which each wheeled axle with its journal boxes, as a unit, may have considerable lateral movement with respect to the frame or body in conforming to irregularities in the track or taking curves.

In the preferred embodiment, the frame is swung from the journal boxes on oppositely inclined hangers that tend always to center the body with respect to the wheeled support, but permit independent lateral movement and the journal boxes are held in uniform spaced relation by a structure that is independent of the frame, and, moving with the boxes and the axles, maintains the brakes which it carries in proper register.

With such an arrangement, a wheeled axle can conform to an irregularity without disturbing the motion of the main mass of the car and can take a curve with an easy swing that smooths out the change in direction of the car and relieves the running gear of heavy strains set up in the usual construction, and the wheel flange wear is greatly reduced.

Further objects and advantages of the invention will appear as the disclosure proceeds and the description is read in connection with the accompanying drawings illustrating a preferred embodiment of the invention, and in which Fig. 1 is a plan view of a four-wheel truck;

Figs. 2 and 3 are longitudinal vertical sections taken on the lines 2—2 and 3—3 of Fig. 1;

Fig. 4 is a horizontal section taken on the line 4—4 of Fig. 3;

Fig. 5 is a transverse vertical section taken on the line 5—5 of Fig. 1;

Figs. 6 and 7 are transverse vertical sections taken on the lines 6—6 and 7—7 of Fig. 2;

Fig. 8 is a perspective view of a framework or structure for holding the journal boxes in uniformly spaced relation and supporting the brakes in continuous register with the wheels;

Fig. 9 is a perspective view of several parts displaced from their assembled positions; and Fig. 10 is a diagrammatic plan view of a car body and two trucks.

But these specific illustrations and the corresponding description are used for the purpose of disclosure only and are not intended to impose unnecessary limitations on the claims.

Each truck of the car includes two wheeled axles 10, each having projecting journals 11 received in a journal box 12 equipped with a journal bearing 13, Fig. 5.

In order to allow the wheeled axles and their boxes free lateral motion, the truck frame is supported on the journal boxes through swing hangers, each of which includes a bow 14 (Figs. 3, 5 and 9) and a seat bar 15. The upper portion of the bow is a transverse bar 16 having a rounded bearing rib 17 (Fig. 5) on its underside to cooperate with a bearing groove 18 between the ridges 19 on top of the journal box 12.

Depending from each end of the bar 16 is an arm 20 whose lower end is formed into an egg-shaped eye 21 to receive the seat bar 15 which is notched and rounded at 22 to bear on the lower surfaces of the eyes 21.

Adjacent to each end, the bar 15 has a concave bearing seat 23 to cooperate with the rounded bearing 24 (Fig. 3) on the bottom of a cylindrical spring seat 25 having legs 26 astride the corresponding end of the bar 15.

Each spring seat 25 receives a coil spring 27, here shown in the conventional form of a large coil which may be single or double according to choice.

The frame of each truck, generally indicated in Fig. 10 by the numeral 32, is supported by the eight coil springs 27, two at each journal box. The truck frame is here shown as composed of side frames connected by transoms made of sheet metal parts welded together. Each of the side frames (Figs. 5 and 9) is composed of two channels 33 back to back with their flanges turned outwardly and welded to a top chord member 34 and a bottom chord member 35. The transoms 36 (Fig. 2) are of like construction, as appears from the drawings, and the description will not go into details because the construction of the truck frame is purely a matter of choice.

The pedestals are faced with sheet metal channels 37 shaped as best illustrated in Fig. 9 to provide faces 38 between which the journal boxes are received and slots 39 for the bar 15.

The coil springs 27 and their seats 25 are received within cylindrical spring casings 41 formed in the side frames and lined with hard metal wear cylinders 42 (Fig. 3), the upper ends of which rest on top of the coil springs.

The slots 39 (Figs. 3 and 9) in which the seat bars 15 are received allow the necessary vertical movement but compel the bars to stay in alignment with the coil springs that they respectively support. This engagement or interlocking between the pedestals and the seat bars makes the truck frame hold the lower ends of the swing hangers in relatively fixed relation while the upper bars of the swing hangers are free to move laterally as the wheeled axles move laterally and take the corresponding journal boxes 12 with them.

The egg-shaped eyes 21 in the arms 20 of the bows 14 permit the bars 15 and the springs supported on them to remain upright while the bows swing back and forth about the rounded bearings 22 on the bottom of the bars 15.

The weight being carried by the swing hangers, it resists the side swinging in proportion to the unavoidable lifting of the truck frame and car body. It also tends constantly to bring the parts back to their normal position of rest, in this instance illustrated in Fig. 5, where it will be observed that the swing hangers are inclined downwardly and outwardly. That inclination is somewhat a matter of choice. But in actual running, the inclination has been found to be satisfactory when swing hangers, 16 13/16" between the bottom of the bearing rib 17 and the bottom of the egg-shaped eyes 21, are inclined outwardly sufficiently to displace the seat bars 7/8". Some engineers will favor greater inclinations, some less, depending upon the weights, speeds and other considerations.

With the swing hangers inclined (Fig. 5) a component of the load tends to move the journal boxes outwardly against the collars 55 on the axle journals. To overcome this tendency and also to carry the brakes, a frame structure, generally indicated by 54 in Fig. 8, is supplied for each pair of boxes. The frame includes two arched end pieces 56 of I-section connected by four arched side pieces 57 of channel-section. The intermediate portions of the latter are equipped with saddles 58 and receive posts 59 on the journal boxes 12 to which they are secured by pins 60, Figs. 6 and 9.

On opposite sides of each post the journal box is provided with spring seats 61 for coil springs 62 (Figs. 5 and 7) which give the frame 54 a slightly yielding support and prevent rattling in service.

Each brake beam 63 (Fig. 2) is swung by brake hanger carriers 46, the upper ends of which are received in U-shaped hooks 47 fixed to the corresponding end piece 56 of the frame 54.

One of the frames 54 is equipped adjacent to each end with spaced bars 64 equipped with dead lever fulcrum clips 65 adjustably mounted on pins 66 inserted through holes 67 in the bars 64. Each clip 65 is connected to the upper end of a dead lever 68 by a pin 69, and each dead lever is equipped with a brake lever fulcrum 70, the two of which carry the corresponding brake beam 63.

The lower end of each dead lever 68 is connected by a pin 71 with a bottom rod 72, the opposite end of which is, in turn, connected to the lower end of the live lever 73 (Fig. 8) equipped with a brake lever fulcrum 74 carrying the other brake beam 63.

The upper end of the live lever 73 is connected to a rod 75, directly or indirectly, connected with the corresponding cylinder lever of a foundation brake gear.

The movement of the journal boxes in the pedestals is free within selected limits set in the present disclosure by the stops 48 reenforced by gussets 49 (Fig. 9). In practice, a free movement of 1 3/8" in each direction has been found satisfactory. But that is also a matter of choice in which engineers will differ under the influence of various considerations of weight and speed and curves.

The lateral swinging of the hangers should be as free as possible within the limits allowed, and to provide for that the journal boxes 12 have passageways 50 at each side to receive the arms 20 of the hangers and allow them to move with absolute freedom, the enlargements 51 bearing against the ends of the ribs 19, serving to hold the arms of the bows properly spaced within the passages.

The two trucks carry a car body 77 on center bearings 78 and side bearings 79 prevent swaying of the body, see Fig. 10.

It has been found that trucks of this construction will round ordinary main line curves without any swiveling, the lateral motion provided by the swing hangers being sufficient to allow the wheeled axles to accommodate themselves to the curves. Just how this is done might be the subject of dispute. The zigzag maneuver by which the wheeled axles of the ordinary truck take a curve put strains on the truck frame that tend to crush it cornerwise and the reaction on the car is manifested in many objectionable vibratory movements. The free lateral motion of the wheeled axles allowed by the truck here disclosed, which motion is yieldingly resisted by the weight of the car swinging on the inclined hangers, lets the wheeled axles do whatever is necessary to take the curve and carry the car around with ease and with no apparent cornerwise strain on the truck structure.

In rounding yard curves, cross-overs and sharp turnouts, the trucks will swivel about the center bearings and the side bearings will act as steadying devices.

Each frame 54 ties the corresponding journal boxes 12 together and makes them, with the wheeled axle on which they rest, move laterally as a unit; and the brakes being supported on the frames 54, they are carried along with the lateral movement and maintained in constant register with the wheels.

By holding the journal boxes in uniformly spaced relation, the frames 54 maintain the hangers in their selected opposite inclination and prevent the concentration of wear on the journal bearings and collars.

Frames 54 of different forms will be designed to suit different conditions and personal preference. A frame having but one side piece 57 at each end secured to a single post 59 at the inner end of each journal box has been found satisfactory under certain conditions. A mere connector will serve to hold the journal boxes in relative position.

What is claimed is:

1. In a car, a frame having pedestals, a wheeled axle having journals outwardly of the wheels, a journal box on each journal movable vertically and transversely in the corresponding pedestal, a swing hanger carried by each journal box to swing about an axis transverse to the journal, resilient means carried by said hangers for supporting the frame, and a connector independent of the frame and axle secured to the journal boxes and holding them in proper fixed spaced relation.

2. In a car, a frame having pedestals, a wheeled axle having journals, a journal box on each journal movable vertically and transversely in the corresponding pedestal, a swing hanger carried by each journal box to swing about an axis transverse to the journal, means for resiliently supporting the frame on the hangers with the latter normally inclined in opposite directions, and a connector independent of the frame and axle secured to the journal boxes and holding them in proper fixed spaced relation.

3. In a car, a frame having pairs of pedestals aligned opposite to each other crosswise to the frame, a wheeled axle for each pair of pedestals having journals, a journal box for each journal movable vertically and transversely in the corresponding pedestal, a swing hanger carried by each journal box to swing about an axis crosswise to the axle, means to support the frame on the hangers, and a connector independent of the frame and axle secured to the journal boxes for each axle for holding them in a substantially fixed spaced relation with the corresponding swing hangers normally inclined oppositely.

4. In a car, a frame having pedestals, a wheeled axle having journals, a journal box on each journal movable vertically and transversely in the corresponding pedestal, a swing hanger carried by each journal box to swing about an axis transverse to the axle, means for supporting the frame on the hangers with the latter oppositely inclined, and a connector independent of the frame and axle secured to the journal boxes for holding the journal boxes in uniformly spaced relation.

5. In a car, a frame having pedestals, a wheeled axle having journals, a journal box on each journal movable vertically and transversely in the corresponding pedestal, a swing hanger carried by each journal box to swing about an axis transverse to the journal, resilient means for supporting the frame on the hangers, means independent of the frame and axle for connecting the journal boxes and holding them in substantially constant spaced relation, and brakes carried by said means.

6. In a car truck, wheeled axles, journal boxes for the axles outwardly of the wheels, a swing hanger pivoted on each journal box, a truck frame resiliently supported on the hangers, a separate frame supported by the journal boxes on each axle, and brakes carried by the separate frames.

7. In a car, a wheeled axle having journals outwardly of the wheels, a journal box for each journal, a swing hanger on each journal box, a frame resiliently carried by the hangers, a post on each journal box, and means connecting the posts to hold the journal boxes in substantially fixed spaced relation.

8. In a car, a wheeled axle having journals, a journal box for each journal, a swing hanger pivotally mounted on each journal box, a frame carried by the hangers, a post on each journal box, and a connecting frame having saddles to receive the posts on the journal boxes, and means to secure the connecting frame to the posts.

9. In a car, a wheeled axle having journals, a journal box for each journal, a swing hanger on each journal box, a frame carried by the hangers, a post on each journal box, a spacing frame connecting the posts on the journal boxes, and springs between the spacing frame and the journal boxes.

10. In a railway car, a plurality of wheeled axles having journals, a journal box for each journal, a swing hanger on each journal box, springs supported by said hangers, and a truck frame supported directly by said springs, said frame having a center bearing plate thereon for pivotally connecting said frame to a car body, a brake frame for each axle, means for mounting said brake frame on the journal boxes of the corresponding axle for holding said journal boxes in fixed spaced relation, and a brake rigging carried by said brake frames.

11. In a railway truck, a plurality of wheeled axles having journals outwardly of the wheels, a truck frame, said frame having depending pedestals, journal boxes for said journals, each movable vertically and transversely in the corresponding pedestal, a swing hanger carried by each journal box to swing about an axis crosswise to the axle, means for resiliently supporting said truck frame from said hangers, a brake frame for each axle connected to the corresponding journal boxes for holding the same in fixed spaced relation, and a brake rigging carried by said brake frames.

12. In a railway car, a plurality of wheeled axles, a journal box on the end of each axle, a truck frame, a truck center bearing for pivotally supporting a car body on said frame, a swing hanger member swingingly supported from each journal box, a hanger bar connecting the lower ends of each swing hanger member, a plurality of concave recesses in each hanger bar, a spring seat having a convex lower surface for engaging each of said recesses, and a spring for each seat for supporting said frame from said bar.

13. In a car truck, wheeled axles, journal boxes for the axles outwardly of the wheels, a swing yoke journaled on each journal box, a truck frame supported by the yokes, and a separate frame for each axle supported on and secured to the two journal boxes for each axle and holding them in proper spaced relation, each of said last-named frames being adapted to support brake apparatus.

CARRIE S. MUSSEY,
*Executrix of the Estate of William H. Mussey, Deceased.*